Figures 1, 2:
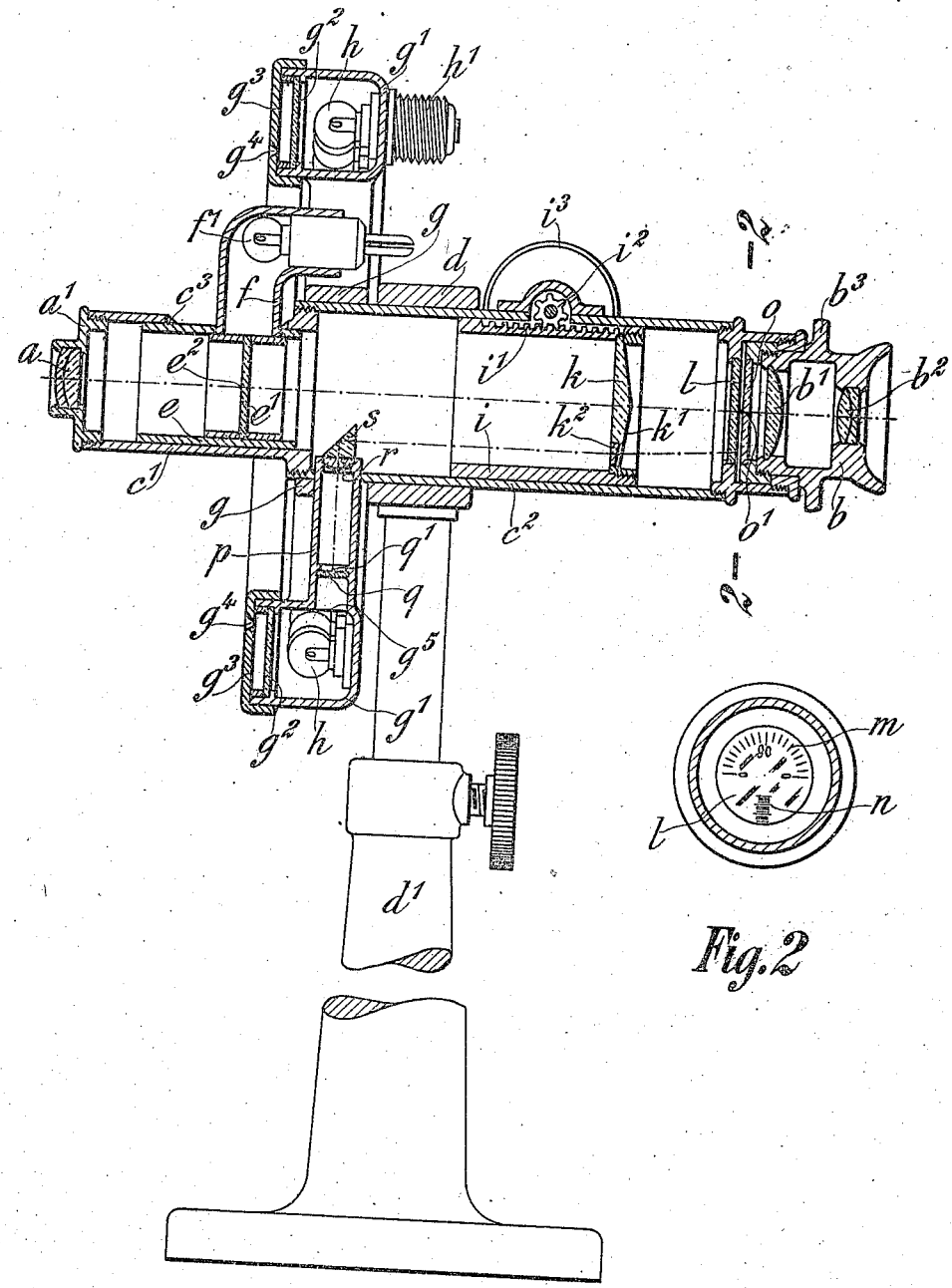

O. HENKER.
OPTICAL TESTING INSTRUMENT.
APPLICATION FILED MAY 26, 1915.

1,162,058.

Patented Nov. 30, 1915.

Inventor
Otto Henker

UNITED STATES PATENT OFFICE.

OTTO HENKER, OF JENA, GERMANY, ASSIGNOR TO THE FIRM OF CARL ZEISS, OF JENA, GERMANY.

OPTICAL TESTING INSTRUMENT.

1,162,058.

Specification of Letters Patent. Patented Nov. 30, 1915.

Application filed May 26, 1915. Serial No. 30,638.

*To all whom it may concern:*

Be it known that I, OTTO HENKER, a citizen of the German Empire, residing at Jena, Germany, have invented a new and useful Optical Testing Instrument, of which the following is a specification.

The invention relates to an apparatus for the determination of the curvatures of the cornea. The measuring principle underlying such apparatus consists, as is well known, in bringing before the eye to be examined an object of known size, for instance two marks at a known distance apart, and in determining the size of the virtual image formed of the said object by the surface of the cornea, which acts as a convex reflector. As the virtual image is formed very approximately in the focal plane of the reflecting cornea surface, it is possible to calculate from the size of the object and of the image and the distance of the object from the eye with sufficient accuracy for practical purposes the focal length and thereby the radius of curvature of the cornea surface. The size of the virtual image is determined with the aid of a microscope, which receives the reflected rays and is provided between its objective and its ocular with a device, with the help of which the required size of the image can be translated into a directly measurable quantity.

The invention relates more particularly to apparatus, with which a measuring object of constant size is employed, and in which, for measuring the size of the virtual image, the microscope is fitted internally with a deflecting device, which deflects the ray pencils entering the microscope by a constant angle in such a manner that two or more images of the measuring object are formed, the said deflecting device being displaceable in the direction of the optical axis, so that the images visible in the microscope can also be displaced relatively to one another.

Most of the apparatus of this kind, known up to the present, which usually have as a measuring object two fixed marks disposed at either side of the microscope, have a deflecting device, which divides the ray pencils entering the microscope into two parts, so that two juxtaposed images are formed, the deflecting device being arranged in such a manner that the direction, in which one image appears to be displaced relatively to the other, is parallel to the line connecting the two fixed marks. When a measurement is being made with such an apparatus, the two images presented to the observer are brought, by the deflecting device being displaced in the direction of the microscope axis, into a certain position relatively to one another, for instance so that they just touch each other in the direction, in which they appear to be displaced relatively to one another. Hence the position of the deflecting device required gives a measure for the size of the virtual image to be determined and thus, if the distance of the measuring object from the eye be kept constant, a measure for the radius of curvature of the cornea. These apparatus, however, only allow of the radius of curvature being determined in each case in one plane, namely that meridian plane which is parallel to the direction, in which the two images visible in the microscope are displaced relatively to one another. For gaining an idea as to the size of the radii of curvature in other meridian planes, a fresh measurement must be made for each meridian. It has, therefore, been suggested in the English patent specification 26,747 of the year 1912, to provide the microscope with a double deflecting device, such that in both of two directions perpendicular to each other there are formed two adjacent images, preferably in conjunction with a circularly shaped mark, so that, with one setting of the apparatus, the images of the mark may be brought in the two perpendicular directions for instance into contact and the radii of curvature be thus measured. When, however, the cornea surface to be examined is astigmatic, it is even then necessary, for determining the principal planes of curvature, to make a series of measurements in different meridian planes.

In the apparatus according to the invention there is used as measuring object a circularly shaped mark, which is fixed for instance concentrically with the microscope axis, and in place of the deflecting devices known up to the present a refracting body is located in the path of the rays, which is bounded on at least one of its sides by a conical surface, the axis of which coincides with the axis of the microscope. Such a conical refracting body may be supposed as having been developed from a series of sector-shaped, circularly disposed refracting prisms, the planes of principal section of which all pass through the microscope axis and each of which deflects the image of the circular mark in the microscope, by an equal amount. When the number of prisms in the circle becomes infinitely great, a conical refracting body results, which forms of the circular mark in the microscope an infinite number of images so to speak, which are disposed in a circle concentrically with the microscope axis and overlap each other. As a consequence of this no image in the true sense of the term results, but, according to the amount by which the rays are deflected, an annular or circular image surface, which has a caustic line both at its outer and at its inner circumference. These caustic lines are, according to the ratios of curvature of the cornea, curves, which have more or less the form of circles concentric with the microscope axis, and their shape shows at a glance the ratios of curvature in all meridians, so that in the case of astigmatic cornea surfaces the direction of the principal planes of curvature may be recognized straight away. The measurement is carried out in a similar manner as with known apparatus; in the case of a fixed microscope the conical refracting body is displaced in the direction of the optical axis, until in the meridian plane, in which the curvature is to be determined, the opposite points of the caustic lines have a certain distance apart, preferably until the opposite points of the inner caustic line just coincide on this meridian. If the distance of the circular mark from the eye to be examined be kept always constant, the position of the refracting body thus ascertained is of itself a measure of the required radius of curvature. The refracting body may be combined with a scale, on which the size of the radius or the corresponding power may be read off directly.

It is immaterial for the working of the apparatus, whether the conical surface is applied to the refracting body in the form of an ordinary cone or in the form of a hollow cone. For obtaining a simple constructive form, in both cases the refracting body will be bounded on one side by the conical surface and on the other side by a plane, which is perpendicular to the microscope surface.

In order to be able in the case of an astigmatically curved cornea to determine the direction of the axes in a simple manner, a fixed angular scale, which is concentric with the optical axis, may be appropriately located in the objective image plane of the microscope along with a rotatable pointer adapted to read on it. A stroke following the direction of a diameter may be appropriately used as a pointer, such a stroke being, with an elliptical caustic line, as in the present case, most easily set in the direction of the great or of the small axis.

The apparatus may be particularly easily manipulated when it is so constructed that in each case the position of the displaceable refracting body or the size itself of the corresponding radius of curvature may be read off in the ocular field of view. This may be done by fitting in the objective image plane of the microscope a rectilinear fixed scale and by forming by means of a suitable optical arrangement, for example a collective lens, on the said scale an image of a corresponding index, which is fixed to the microscope, through a refracting prism, which is rigidly fixed to the displaceable refracting body, the said prism being so disposed that its plane of principal section always passes through the scale which lies in the objective image plane. The prism, therefore, causes, on being displaced in the direction of the optical axis, the image of the index to move along the scale, so that to each position of the mark-image there corresponds a certain position of the prism and hence of the refracting body.

The invention is shown in the drawing by a constructional example, of which—

Figure 1 represents a vertical longitudinal section of the whole apparatus and Fig. 2 a cross-section on line 2—2 of Fig. 1.

The main part of the apparatus is formed by a microscope, of which the objective is marked $a$ and the ocular lenses $b^1$ and $b^2$. The objective $a$ is fixed by means of its mount $a^1$ to a tube $c^1$; the ocular is journaled by means of its mount $b$ to a tube of somewhat greater diameter $c^2$, which is screwed to the tube $c^1$, in such a manner as to be rotatable and yet axially undisplaceable.

In order that the ocular may be easily rotated, its mount $b$ is provided with a milled flange $b^3$. The whole rests in a ring $d$ surrounding the tube $c^2$ on an extensible stand $d^1$.

Behind the objective $a$ and mounted in a tubular piece $e$, which is displaceable in the tube $c^1$, there is a plane parallel glass plate $e^1$ carrying on its front side a sighting mark $e^2$. To the tubular piece $e$ is fitted a bent tube $f$, which reaches through a slot $c^3$ of the tube $c^1$ and contains an incandescent electric lamp $f^1$, which illuminates the glass plate $e^1$ in the direction of its surface and thus renders the sighting mark $e^2$ visible to an eye looking through the objective $a$.

On the left-hand end of tube $c^2$ there is fixed by means of a hub $g$ a ring-shaped casing $g^1$ of U-shaped cross-section, which has inside it a number of incandescent electric lamps $h$, which are arranged in a circle concentric to the microscope axis and can be supplied jointly with current from a plug $h^1$.

The casing $g^1$ of the lamps $h$ is covered on the side facing the objective $a$ with a ring $g^2$ made of ground glass and in front of this ring is a metal cover $g^3$, which leaves free only a narrow annular slit $g^4$. The mean diameter of the slit $g^4$ is so chosen with relation to the diameter of the circle, on which the lamps $h$ are disposed, that the slit appears brightly illuminated from a point on the microscope axis lying at a short distance in front of the objective.

Within the tube $c^2$ a tubular piece $i$ bearing a rack $i^1$ may be displaced by means of a pinion $i^2$ and a milled disk $i^3$ in the direction of the microscope axis. The tubular piece $i$ bears a glass body $k$, which is plane on one side and is bounded on its other side by a conical surface $k^1$, the axis of which coincides with the microscope axis. In a recess in the glass body $k$ a small refracting prism $k^2$ is cemented, the plane of principal section of which passes through the microscope axis.

Behind the glass body $k$ and fixed to the casing is a plane parallel glass disk $l$, the rear surface of which coincides with the objective image plane and which bears on this surface a degree scale $m$, which is concentric with the microscope axis and extends over the upper semicircle (Fig. 2), and a scale $n$ extending in the direction of the vertical diameter (Fig. 2).

Immediately behind the disk $l$ there is a second plane parallel disk $o$, which is connected with the rotatable ocular and is provided on the side facing the disk $l$ with a stroke $o^1$ extending in the direction of a diameter.

In the lower part of the tube $c^2$ and perpendicular to it a small tubular piece $p$ is fitted, which joins onto an opening $g^5$ in the inner surface of the annular casing $g^1$ and therefore also receives light from the incandescent lamps $h$.

Fitted inside the part $p$ there is a ground glass disk $q$, bearing on its upper side a transverse mark $q^1$, and at its upper end there is a collective lens $r$ and, cemented to the latter, a reflecting prism $s$, which deflects the rays coming from the mark $q^1$ toward the ocular. The collective lens $r$ forms through the prism $k^2$ an image of the mark $q^1$ on the scale $n$ lying in the objective image plane.

When in use, the apparatus is directed toward the eye to be examined and, by displacing the part $e$, the mark $e^2$ on the glass plate $e^1$, which serves the patient as the mark on which he fixes his gaze, is set in such a manner that the patient sees a sharp image of the mark lying in infinity. The distance of the apparatus from the eye to be examined should be the same for all measurements and be determined in such a manner that, if the glass body $k$ were not there, the rays proceeding from the circular illuminated slit $g^4$ and reflected at the cornea surface would be united by the ocular $a$ in the ocular focal plane to an image of the luminous slit. In consequence of the interposition of the glass body $k$ there results instead of the actual image an image surface having two caustic lines, which render the curvature of the examined cornea visible in all meridians. By setting the mark $o^1$ to the greatest or smallest diameter of a caustic line, in the case of an astigmatically curved cornea surface the position of the planes of principal curvature may be read off on the angular scale $m$. The size of the radius of curvature of the cornea in a certain meridian is obtained by displacing by means of the milled disk $i^3$ the tubular piece $i$ along with the glass body $k$ until on the required meridian, to which the mark $o^1$ has been set, the opposite points of the inner caustic line coincide. As, when the glass body $k$ is displaced, in consequence of the prism $k^2$ being moved along with it, the position of the image also varies, that the lens $r$ forms of the fixed mark $q^1$ on the scale $n$, the position at any moment of the glass body $k$ and consequently the corresponding radius of curvature in the ocular field of view may be read off on the scale $n$.

I claim:

1. In an optical testing instrument a circular mark, a microscope disposed within the said mark and a refracting body fitted between the ocular and the objective of the said microscope so as to be displaceable in the direction of the microscope axis, the said refracting body being bounded on at least one side by a conical surface, the axis of which coincides with that of the microscope.

2. In an optical testing instrument a circular mark, a microscope disposed within the said mark, a refracting body fitted between the ocular and the objective of the said microscope so as to be displaceable in the direction of the microscope axis, the said refracting body being bounded on at least one side by a conical surface, the axis of which coincides with that of the microscope, a fixed member bearing a rectilinear scale in the objective image plane, an indicating mark fixed to the microscope and adapted to read on the said scale, a prism fixed to the said refracting body so that its plane of principal section always passes through the said scale and an optical arrangement adapted to form an image of the said indicating mark on the said scale through the said prism.

OTTO HENKER.